(12) United States Patent
Chen

(10) Patent No.: US 11,811,029 B2
(45) Date of Patent: Nov. 7, 2023

(54) CHARGING METHOD AND BATTERY PACK

(71) Applicant: SIMPLO TECHNOLOGY CO., LTD., Hukou Township, Hsinchu County (TW)

(72) Inventor: Chien-Wen Chen, Hsinchu County (TW)

(73) Assignee: SIMPLO TECHNOLOGY CO., LTD., Hsinchu County (TW)

( * ) Notice: Subject to any disclaimer, the term of this patent is extended or adjusted under 35 U.S.C. 154(b) by 27 days.

(21) Appl. No.: 17/540,579

(22) Filed: Dec. 2, 2021

(65) Prior Publication Data

US 2022/0384864 A1    Dec. 1, 2022

(30) Foreign Application Priority Data

May 26, 2021    (TW) .................................. 110119103

(51) Int. Cl.
*H01M 10/48*    (2006.01)

(52) U.S. Cl.
CPC .................................. *H01M 10/48* (2013.01)

(58) Field of Classification Search
CPC .................................................... H01M 10/48
See application file for complete search history.

(56) References Cited

U.S. PATENT DOCUMENTS

| 2012/0223672 | A1* | 9/2012 | Liu | ........................... | H02J 7/04 |
| | | | | | 320/107 |
| 2013/0229154 | A1* | 9/2013 | Benjamin | ............ | G01R 31/378 |
| | | | | | 320/132 |
| 2015/0236536 | A1* | 8/2015 | Aradachi | .............. | H02J 7/0021 |
| 2017/0125857 | A1* | 5/2017 | Tang | ...................... | H02J 7/0014 |
| 2017/0302089 | A1* | 10/2017 | Bernauer | | |

FOREIGN PATENT DOCUMENTS

| CN | 203339780 U | * 12/2013 | ................ H02J 7/00 |
| TW | 202114320 A | 4/2021 | |

* cited by examiner

*Primary Examiner* — Catherine T. Rastovski
*Assistant Examiner* — Lal C Mang
(74) *Attorney, Agent, or Firm* — Muncy, Geissler, Olds & Lowe, P.C.

(57) ABSTRACT

A charging method and a battery pack are provided. The charging method for charging multiple cells of the battery pack include steps of: charging the cells of the battery pack using a charging voltage, and detecting a voltage difference $\Delta V_{TDV}$ between the cells, wherein a value of the charging voltage is a rated charging voltage value; and obtaining a new charging voltage value smaller than the rated charging voltage value according to the voltage difference $\Delta V_{TDV}$ between the cells, and decreasing the charging voltage to the new charging voltage value for charging the cells.

13 Claims, 8 Drawing Sheets

CHARGING METHOD AND BATTERY PACK

CROSS-REFERENCE TO RELATED APPLICATIONS

This application claims priority of No. 110119103 filed in Taiwan R.O.C. on May 26, 2021 under 35 USC 119, the entire content of which is hereby incorporated by reference.

BACKGROUND OF THE INVENTION

Field of the Invention

This disclosure relates to a charging method and a battery pack, and more particularly to a charging method for adjusting a charging condition according to a voltage difference between cells, and a battery pack using the charging method.

Description of the Related Art

After a battery pack has been used or placed for a long time, a voltage difference between cells of the battery pack would be higher due to the cell characteristic differences, such as the aging difference between the cells or the different of the state of health (SOH) between the cells. The greater the voltage difference gets, the easier the single cell tend to exceed a rated voltage in the charging process of the battery pack. The so-called rated voltage represents the voltage within the application range specified in specifications of the cell manufacturer. The excessive voltage of the cell tends to accelerate the degradation and gas production of the cell, which cause the problems, such as cell expansion or even the safety doubt.

In the prior art, when happening the voltage difference between cells, a voltage monitoring mechanism or balancing mechanism is provided to ease the state. However, the balancing mechanism cannot effectively suppress the problem of the voltage difference between the substantially defective cells, and the cells finally eventually lead to high voltage.

FIG. 1 is a schematic view showing a conventional cell system disclosed in Taiwan Patent Publication No. TW202114320. TW202114320, a structure and a method of balancing a state of a voltage difference between cells using a balancing mechanism. Referring to FIG. 1, a battery module 12-1 according to this art includes a cell group in series 123 and N balancing circuits (balancing Ckt) 122-1, ..., 122-N-1, 122-N. The cell group in series 123 has N cells B-1, ... B-N-1, B-N serially connected together and coupled to a module managing circuit 121. In order to solve the voltage unbalancing problem, a battery system managing unit 11 and the module managing circuit 121 of a battery system 100 need to perform voltage converting, voltage collecting and voltage monitoring on each of the battery modules (e.g., each of cells (e.g., cells B-1, ..., B-N-1, B-N) in the battery modules 12-1, 12-2, ..., 12-M-1, 12-M), and then to charge or discharge each of the cells using the balancing circuit, so that the overall voltage balancing and controlling mechanism can be performed.

The conventional over-voltage protection mechanism can protect the cells from being charged to the excessive voltages. However, when the cells are continuously used under the state of voltage difference between the cells, it makes the voltage difference between the cells increased, and also more serious to the poor conditions of the cells, and thereby resulting in the repeated overcharging voltage protections. As the frequency of the overvoltage protections increases, the damage to the cells is also gradually growing, and finally still causing the cell expansion or safety problem of the battery pack.

BRIEF SUMMARY OF THE INVENTION

An objective according to an embodiment of this disclosure is to provide a charge control method and a battery pack. Another objective is to dynamically adjust a charging voltage according to a voltage difference $\Delta V_{TDV}$ between cells, so that the highest voltage of the cells can be controlled not to exceed the rated charging voltage of each cell due to the decrease of the charging voltage.

According to an embodiment of this disclosure, a charging method for charging multiple cells of a battery pack is provided. The charging method includes the following steps. A potential failure voltage difference $\Delta V_{PF}$ is set. The cells of the battery pack are charged with a rated charging voltage value, and the voltage difference $\Delta V_{TDV}$ between the cells is detected. A first charging voltage value smaller than the rated charging voltage value is obtained according to the voltage difference $\Delta V_{TDV}$ between the cells. The rated charging voltage value is decreased to the first charging voltage value for charging the cells. A second charging voltage value smaller than the first charging voltage value is obtained according to the voltage difference $\Delta V_{TDV}$ between the cells. The first charging voltage value is decreased to the second charging voltage value for charging the cells. When the voltage difference $\Delta V_{TDV}$ between the cells satisfies the potential failure voltage difference $\Delta V_{PF}$, the charging voltage is decreased to a protection charging voltage value for the potential failure voltage difference $\Delta V_{PF}$. The voltage difference $\Delta V_{TDV}$ between the cells is one of the voltage differences between arbitrary two of the cells.

In one embodiment, the step of obtaining the first charging voltage value smaller than the rated charging voltage value according to the voltage difference $\Delta V_{TDV}$ between the cells includes the following steps. A first threshold voltage and a first charging voltage value corresponding to the first threshold voltage are obtained from a memory of a battery management unit of the battery pack, wherein the first charging voltage value is smaller than the rated charging voltage value and greater than the protection charging voltage value for the potential failure voltage difference $\Delta V_{PF}$. It is determined whether the voltage difference $\Delta V_{TDV}$ between the cells satisfies the first threshold voltage. When the voltage difference $\Delta V_{TDV}$ between the cells satisfies the first threshold voltage, the rated charging voltage value is decreased to the first charging voltage value.

In one embodiment, the step of obtaining the second charging voltage value smaller than the first charging voltage value according to the voltage difference $\Delta V_{TDV}$ between the cells includes the following steps. A second threshold voltage and the second charging voltage value corresponding to the second threshold voltage are obtained from the memory of the battery management unit of the battery pack, wherein the second charging voltage value is smaller than the first charging voltage value and greater than the protection charging voltage value for the potential failure voltage difference $\Delta V_{PF}$. It is determined whether the voltage difference $\Delta V_{TDV}$ between the cells satisfies the second threshold voltage. When the voltage difference $\Delta V_{TDV}$ between the cells satisfies the second threshold voltage, the first charging voltage value is decreased to the second charging voltage value.

In one embodiment, the step of obtaining the first charging voltage value smaller than the rated charging voltage value according to the voltage difference $\Delta V_{TDV}$ between the cells includes the following steps. The first charging voltage value is calculated by a charge function Fcv and the voltage difference $\Delta V_{TDV}$ between the cells.

In one embodiment, the charge function Fcv is a function of the voltage difference $\Delta V_{TDV}$ between the cells.

In one embodiment, the charge function Fcv is a function of the voltage difference $\Delta V_{TDV}$ between the cells, a number of cells in series and the rated charging voltage value of the cells, and further values determined by the charge function Fcv are smaller than the rated charging voltage value.

In one embodiment, the charge function Fcv is equal to (the rated charging voltage value xthe number of cells in series)−the voltage difference $\Delta V_{TDV}\times$(the number of cells in series−N), where N is a natural number greater than or equal to 1 and smaller than the number of cells in series.

In one embodiment, the battery pack does not contain multiple balancing circuits respectively connected to the cells, and the charging method does not include a step of balancing the cells using the balancing circuits.

In one embodiment, detecting of the voltage difference $\Delta V_{TDV}$ between the cells starts when any voltage of the cells is greater than a voltage-difference-start-detecting value.

In one embodiment, the voltage difference $\Delta V_{TDV}$ between the cells is a voltage difference between a maximum voltage and a minimum voltage of the cells.

According to an embodiment of this disclosure, a battery pack is provided and includes multiple cells, wherein the cells are charged using the charging method according to each embodiment.

In summary, it is possible that no balancing circuit is disposed in the battery pack, and no balancing mechanism is adopted upon charging according to an embodiment of this disclosure. Instead, the charging voltage is dynamically adjusted according to the voltage difference $\Delta V_{TDV}$ between the cells. Thus, when the cells are charged in the state with the voltage difference $\Delta V_{TDV}$, the highest voltage of the cells can be controlled not to exceed the rated charging voltage value of each cell due to decrease of the charging voltage, so that the safety can be enhanced.

DETAILED DESCRIPTION OF THE INVENTION

Figure 1:
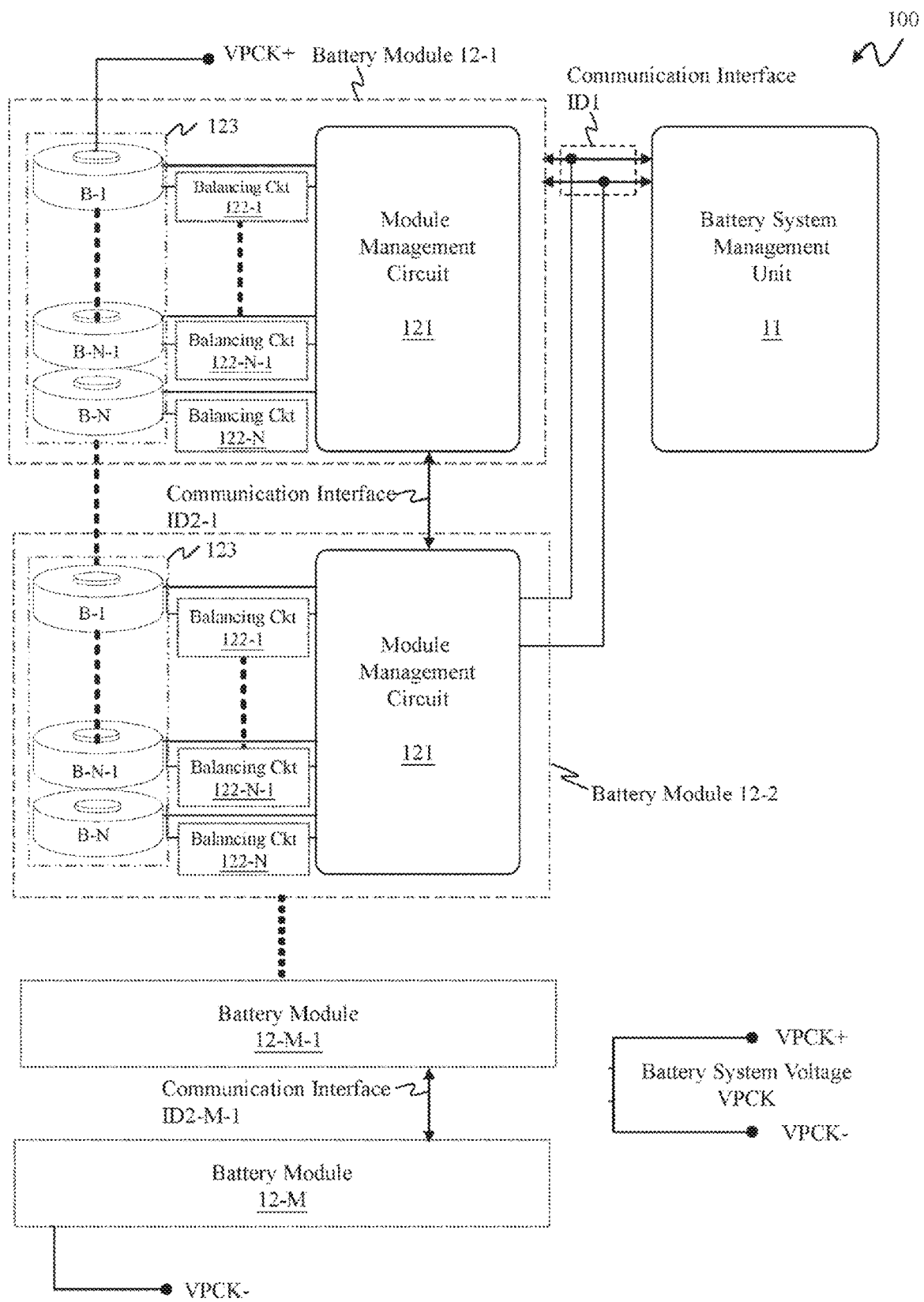
FIG. 1 is a schematic view showing a conventional cell system.
Figure 2:
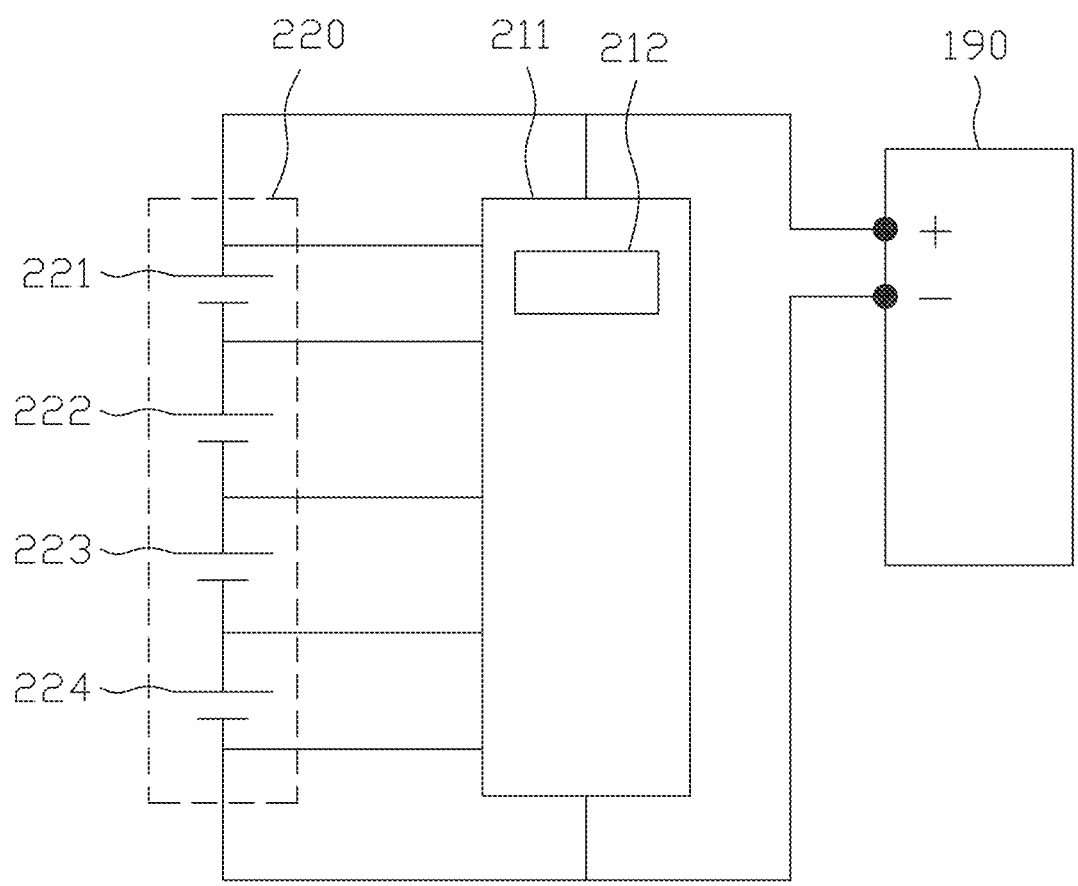
FIG. 2 is a schematic view showing a battery pack according to an embodiment of this disclosure.

FIG. 2 is a schematic view showing a battery pack according to an embodiment of this disclosure. Referring to FIG. 2, a battery pack 200 is charged by an external power 190 according to an embodiment of this disclosure. The battery pack 200 includes a cell group in series 220 and a battery management unit (BMU) 211. The cell group in series 220 includes multiple cells 221 to 224. The BMU 211 electrically connected to the cell group in series 220 and the cells 221 to 224 to measure voltages of the cells 221 to 224. In one embodiment, the battery pack 200 adopts the method of adjusting charging conditions according to a voltage difference or voltage differences between the cells 221 to 224. Preferably, the battery pack 200 is used in a notebook computer.

A charging method of charging the battery pack 200 is provided according to an embodiment of this disclosure. The charging method enables the BMU 211 to measure the voltages of the cells 221 to 224 in each series of the cell group 220 and uses a charging mechanism to immediately monitor whether there is a trend that the voltage differences gradually increase according to measurement results of each series of cell voltages, and thus to adjust the charging voltage. Accordingly, the problem of the over-charging voltage may be solved. In a first implementation aspect, when the voltage differences between the cells 221 to 224 appear or even the voltage differences continuously increase, the charging voltage is decreased according to set thresholds of the voltage differences between several cells. Alternatively, in a second implementation aspect, the charging voltage is adjusted through the real-time monitoring and calculating by the BMU 211 wherein the decreased charging condition can prevent the cells 221 to 224 from having the too-high voltages, which cause the excessive voltage protection. In the following, the embodiment of this disclosure will be explained in detail.

Figure 3:
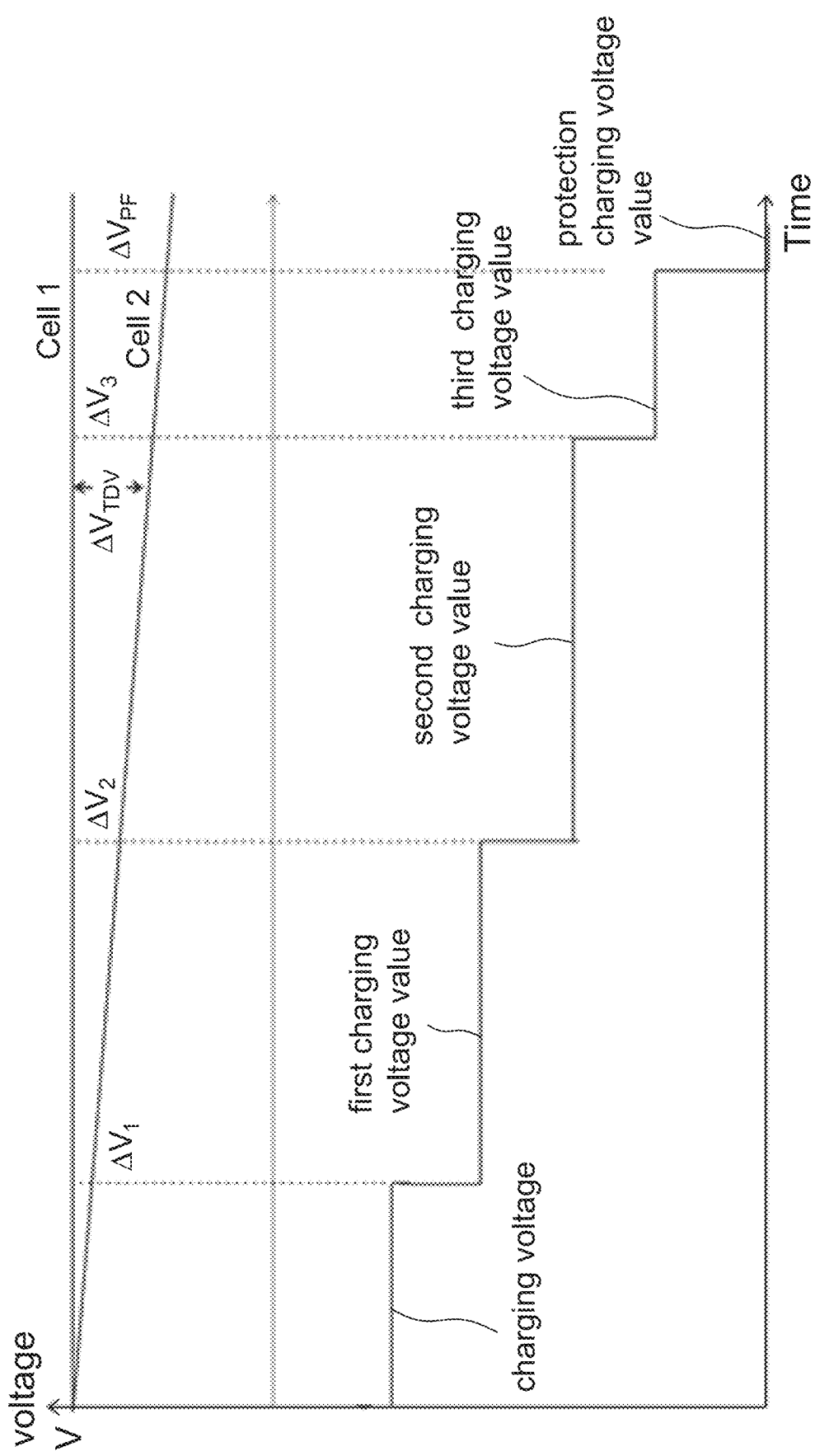
FIG. 3 is a schematic view showing a graph of time versus a maximum voltage difference between cells of a battery pack in a first implementation aspect of this disclosure.

FIG. 3 is a schematic view showing a graph of time versus a maximum voltage difference between cells of a battery pack in a first implementation aspect of this disclosure. In FIG. 3, the vertical axis denotes the voltage, and the horizontal axis denotes the time. Cell 1 denotes a line or curve corresponding to a maximum voltage among multiple voltages of the cells 221 to 224. Cell 2 denotes a line or curve corresponding to a minimum voltage among the voltages of the cells 221 to 224. $\Delta V_{TDV}$ denotes the voltage difference between the lines or curves Cell 1 and Cell 2, and is thus the maximum voltage difference between two cell voltages of the cells 221 to 224 in the embodiment of FIG. 3. FIG. 3 shows the method of decreasing the charging voltage after the voltage difference $\Delta V_{TDV}$ between the cells 221 to 224 exceeds the thresholds of the voltages in one embodiment.

In this embodiment, the thresholds of voltage differences of four cells are adopted, and the thresholds include, from low to high, a first threshold voltage $\Delta V_1$, a second threshold voltage $\Delta V_2$, a third threshold voltage $\Delta V_3$ and a potential failure (PF) or permanent failure (PF) voltage difference $\Delta V_{PF}$. This disclosure does not restrict the value of the potential failure, wherein PF usually denotes a threshold value at which the battery pack cannot be used, and the value thereof can be properly set according to the product specification or the user's exception. In addition, five charging voltages are set, and the values of the charging voltages include, from high to low, a rated charging voltage value, a first charging voltage value, a second charging voltage value, a third charging voltage value and a protection charging voltage value for the potential failure voltage difference $\Delta V_{PF}$. Preferably, the threshold voltages and the charging voltage are respectively stored in a memory 212 of the BMU 211 and thus can be timely accessed by the BMU 211. Referring further to FIG. 3, in the charging process according to an embodiment of this disclosure, there is no step of increasing the charging voltage. Preferably, the charging voltage is only decreased in the overall charging process.

In one embodiment, after the BMU 211 has measured the voltage differences $\Delta V_{TDV}$ between the cells 221 to 224 reaching a certain threshold, the BMU 211 reads the charging voltage corresponding to the certain threshold from the memory 212, and charges the cells 221 to 224 using the corresponding charging voltage to decrease the charging voltage of the external power 190 for charging the cells 221 to 224. Decreasing the charging voltage can prevent the over-voltage condition from occurring in the charging process of charging the cell with the highest voltage when the voltage differences $V_{TDV}$ are present between the cells 221 to 224.

More specifically, referring to FIG. 3, when the voltage difference $\Delta V_{TDV}$ between the cells 221 to 224 reaches the first threshold voltage $\Delta V_1$, the BMU 211 decreases the charging voltages of the cells 221 to 224 to the first charging voltage value. Similarly, when the voltage difference $\Delta V_{TDV}$ between the cells 221 to 224 reaches the potential failure voltage difference $\Delta V_{PF}$, the BMU 211 decreases the charging voltages of the cells 221 to 224 to the protection charging voltage value for the potential failure voltage difference $\Delta V_{PF}$.

Figure 4:
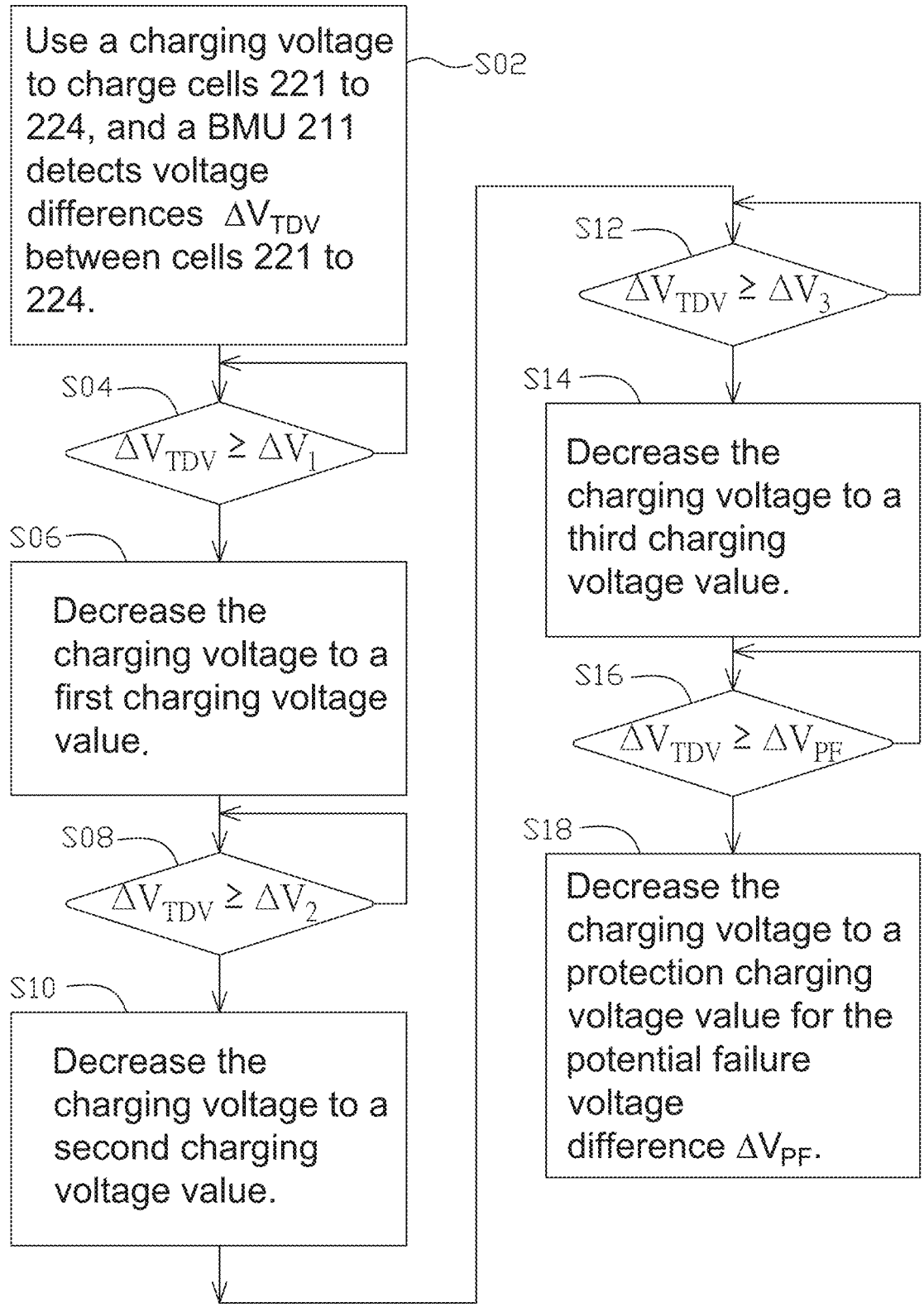
FIG. 4 is a flow chart showing a charging method in the embodiment of FIG. 3.

FIG. 4 is a flow chart showing a charging method in the embodiment of FIG. 3. In one embodiment, the charging method capable of charging the battery pack 200 is provided. Referring to FIG. 4, the charging method includes the following steps.

In a step S02, a charging voltage is used to charge the cells 221 to 224, and the BMU 211 detects the voltage difference $\Delta V_{TDV}$ between the cells 221 to 224. Preferably, a value of the charging voltage is a rated charging voltage value. In one embodiment, the voltage difference $\Delta V_{TDV}$ between the cells 221 to 224 may be the voltage differences between arbitrary two of the cells 221 to 224. Preferably, the voltage difference $\Delta V_{TDV}$ between the cells 221 to 224 may be the difference between the maximum voltage and the minimum voltage of the cells 221 to 224. That is, the voltage difference $\Delta V_{TDV}$ between the cells 221 to 224 may be the maximum voltage difference among the voltage differences between arbitrary two of the cells 221 to 224.

In a step S04, it is determined whether the voltage difference $\Delta V_{TDV}$ between the cells 221 to 224 satisfies the first threshold voltage $\Delta V_1$ (preferably $\Delta V_{TDV} \le \Delta V_1$) or not. If yes, the process enters a step S06. If not, the process returns to the step S04.

In the step S06, the BMU 211 decreases the charging voltage to a first charging voltage value. Preferably, the charging voltage is decreased from the rated charging voltage value to the first charging voltage value.

In a step S08, it is determined whether the voltage difference $\Delta V_{TDV}$ between the cells 221 to 224 satisfies the second threshold voltage $\Delta V_2$ (preferably $\Delta V_{TDV} \le \Delta V_2$) or not. If yes, the process enters a step S10. If not, the process returns to the step S08.

In the step S10, the BMU 211 decreases the charging voltage to a second charging voltage value.

In a step S12, it is determined whether the voltage difference $\Delta V_{TDV}$ between the cells 221 to 224 satisfies the third threshold voltage $\Delta V_3$ (preferably $\Delta V_{TDV} \le \Delta V_3$) or not. If yes, the process enters a step S14. If not, the process returns to the step S12.

In the step S14, the BMU 211 decreases the charging voltage to a third charging voltage value.

In a step S16, it is determined whether the voltage difference $\Delta V_{TDV}$ between the cells 221 to 224 satisfies the potential failure voltage difference $\Delta V_{PF}$ (preferably $\Delta V_{TDV} \le \Delta V_{PF}$) or not. If yes, the process enters a step S18. If not, the process returns to the step S16.

In the step S18, the BMU 211 decreases the charging voltage to a protection charging voltage value for the potential failure voltage difference $\Delta V_{PF}$.

Figure 5:
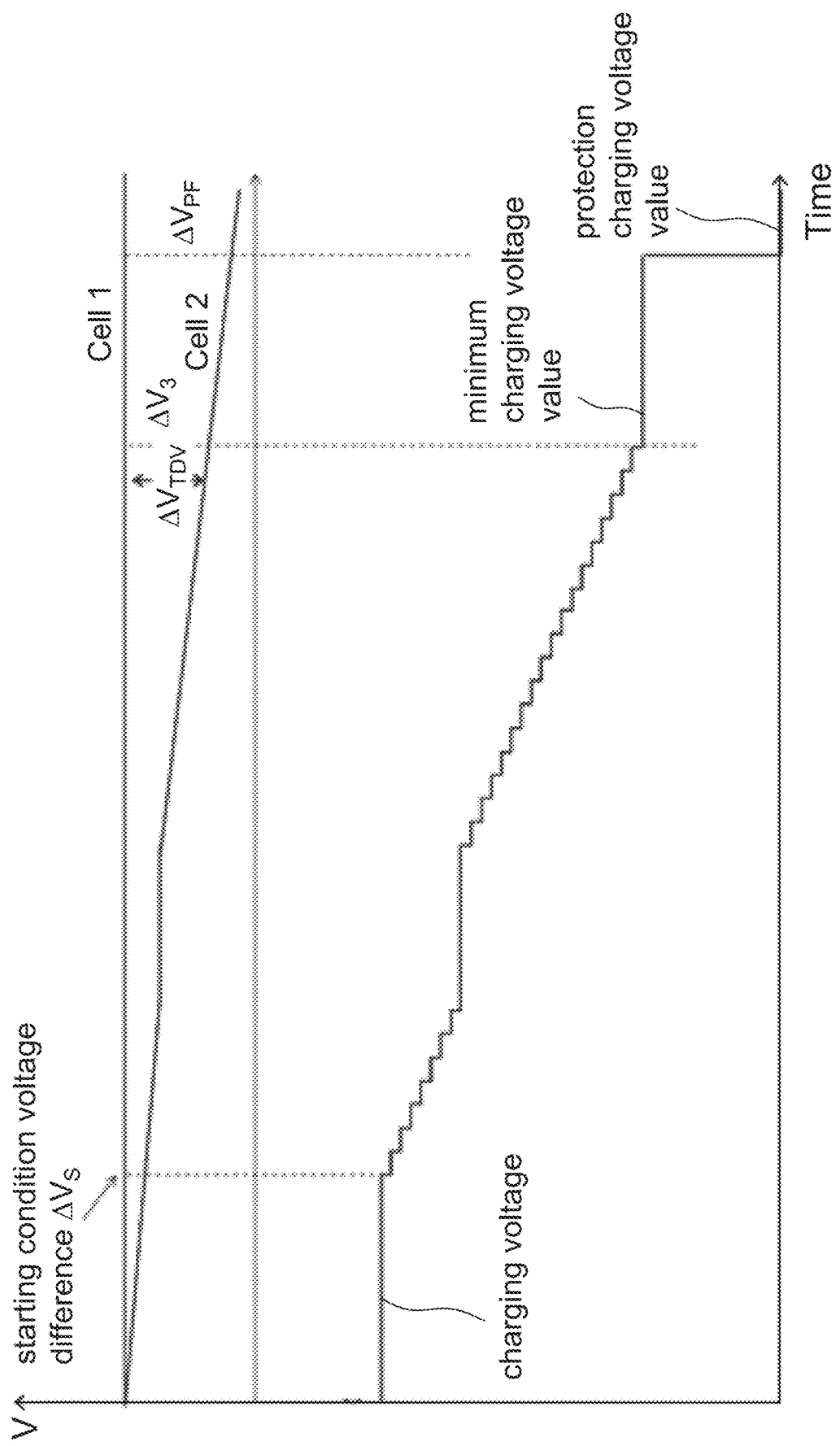
FIG. 5 is a schematic view showing a chart of time versus a maximum voltage difference between cells of a battery pack in a second implementation aspect of this disclosure.

FIG. 5 is a schematic view showing a chart of time versus a maximum voltage difference between cells of a battery pack in a second implementation aspect of this disclosure. In FIG. 5, the vertical axis denotes the voltage, and the horizontal axis denotes the time. Cell 1 denotes a line or curve corresponding to a maximum voltage among the voltages of the cells 221 to 224. Cell 2 denotes a line or curve corresponding to a minimum voltage among the voltages of the cells 221 to 224. $\Delta V_{TDV}$ denotes the voltage difference between the lines or curves Cell 1 and Cell 2, and is thus the maximum voltage difference between two cell voltages of the cells 221 to 224 in the embodiment of FIG. 5. In the embodiment of FIG. 5, the charging voltage is calculated using a charge function Fcv. Compared with the embodiment of FIG. 3, the memory 212 only needs to store the appropriate charge function Fcv without storing the threshold voltage and the charging voltage.

In the second implementation aspect of this disclosure, the BMU 211 calculates an appropriate new charging voltage value according to the charge function Fcv stored in the memory 212 and the measured voltage difference $\Delta V_{TDV}$ by real-time detecting the condition of the voltage difference $\Delta V_{TDV}$ between the cells 221 to 224, and real-time updating the charging voltages of the cells 221 to 224. In one embodiment, the charge function Fcv may be set according to the rated charging voltage value or the overcharging voltage protection value and the charge function Fcv may also be determined in the manner in which the charging voltages do not exceed the rated charging voltage value or the overcharging voltage protection value. The BMU 211 calculates the appropriate new charging voltage value according to the charge function Fcv and the measured voltage difference $\Delta V_{TDV}$, and then automatically real-time updates the charging voltages of the cells 221 to 224.

In one embodiment, the charge function Fcv is a function of the voltage difference $\Delta V_{TDV}$ between the cells 221 to 224, and the number of cells in series and rated charging voltage value of the cells 221 to 224. In addition, the values determined according to the charge function Fcv are smaller than the rated charging voltage value.

In one embodiment, the charge function Fcv is the new charging voltage value=(the rated charging voltage value of one single cell×the number of cells in series)−voltage difference $\Delta V_{TDV}$×(the number of cells in series−N), where N is a natural number greater than or equal to 1 and smaller than the number of cells in series. In the example of the embodiment of FIG. 2, it is possible that N=1, N=2 or N=3. Referring again to FIG. 5, the charge function Fcv is a function not rising with time according to an embodiment of this disclosure. More specifically, the charge function Fcv is a function which does not rise with the time.

In one embodiment, it is also possible to store a start-condition voltage difference for a voltage compensation in the memory 212. When the voltage difference $\Delta V_{TDV}$ is greater than the start-condition voltage difference, the BMU 211 starts to real-time calculate the new charging voltage value according to the charge function Fcv and the voltage difference $\Delta V_{TDV}$ between the cells 221 to 224, and then charges the cells 221 to 224 according to the calculated new charging voltage value.

Figure 6:
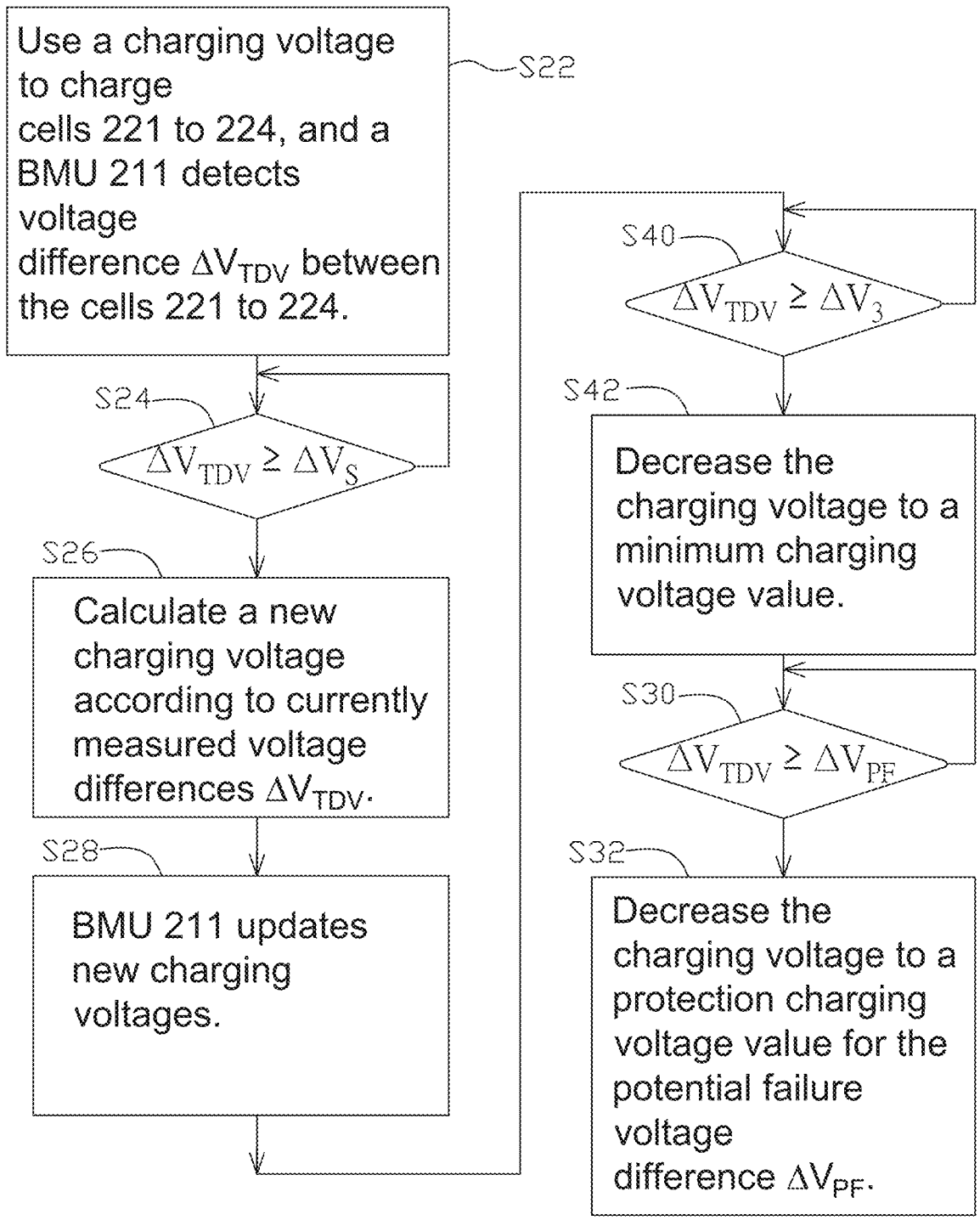
FIG. 6 is a flow chart showing a charging method in the embodiment of FIG. 5.

FIG. 6 is a flow chart showing a charging method in the embodiment of FIG. 5. In one embodiment, the charging method capable of charging the battery pack 200 is provided. Referring also to FIG. 6, the charging method includes the following steps.

In a step S22, a charging voltage is used to charge the cells 221 to 224, and the BMU 211 detects the voltage difference $\Delta V_{TDV}$ between the cells 221 to 224. The types of the voltage differences $\Delta V_{TDV}$ between the cells 221 to 224 may be found in the descriptions associated with the step S02.

In a step S24, it is determined whether the voltage difference $\Delta V_{TDV}$ satisfies the start-condition voltage difference $\Delta V_S$ (preferably $\Delta V_{TDV} \geq \Delta V_S$) or not. If yes, the process enters a step S26. If not, the process returns to the step S24.

In the step S26, a new charging voltage is calculated according to the currently measured voltage difference $\Delta V_{TDV}$. Preferably, the charge function Fcv stored in the memory 212 is read, and the new charging voltage is calculated according to the charge function Fcv stored in the memory 212 and the measured voltage difference $\Delta V_{TDV}$.

In a step S28, the BMU 211 updates the new charging voltage.

In a step S30, it is determined whether the voltage difference $\Delta V_{TDV}$ between the cells 221 to 224 satisfies the potential failure voltage difference $\Delta V_{PF}$ (preferably $\Delta V_{TDV} \geq \Delta V_{PF}$) or not. If yes, the process enters a step S32. If not, the process returns to the step S30.

In the step S32, the BMU 211 decreases the charging voltage to a protection charging voltage value for the potential failure voltage difference $\Delta V_{PF}$.

Referring to FIGS. 5 and 6, the charging method in one embodiment may further preferably include the following steps between the steps S28 and S30. In a step S40, it is determined whether the voltage difference $\Delta V$rwv between the cells 221 to 224 satisfies the third threshold voltage $\Delta V_3$ (preferably $\Delta V_{TDV} \geq \Delta V_3$) or not. If yes, the process enters a step S42. If not, the process returns to the step S40. In one embodiment, the third threshold voltage $\Delta V_3$ corresponds to a minimum charging voltage in a normal charging state.

In the step S42, the BMU 211 decreases the charging voltage to a minimum charging voltage. Then, the process enters the step S30.

Figure 7:
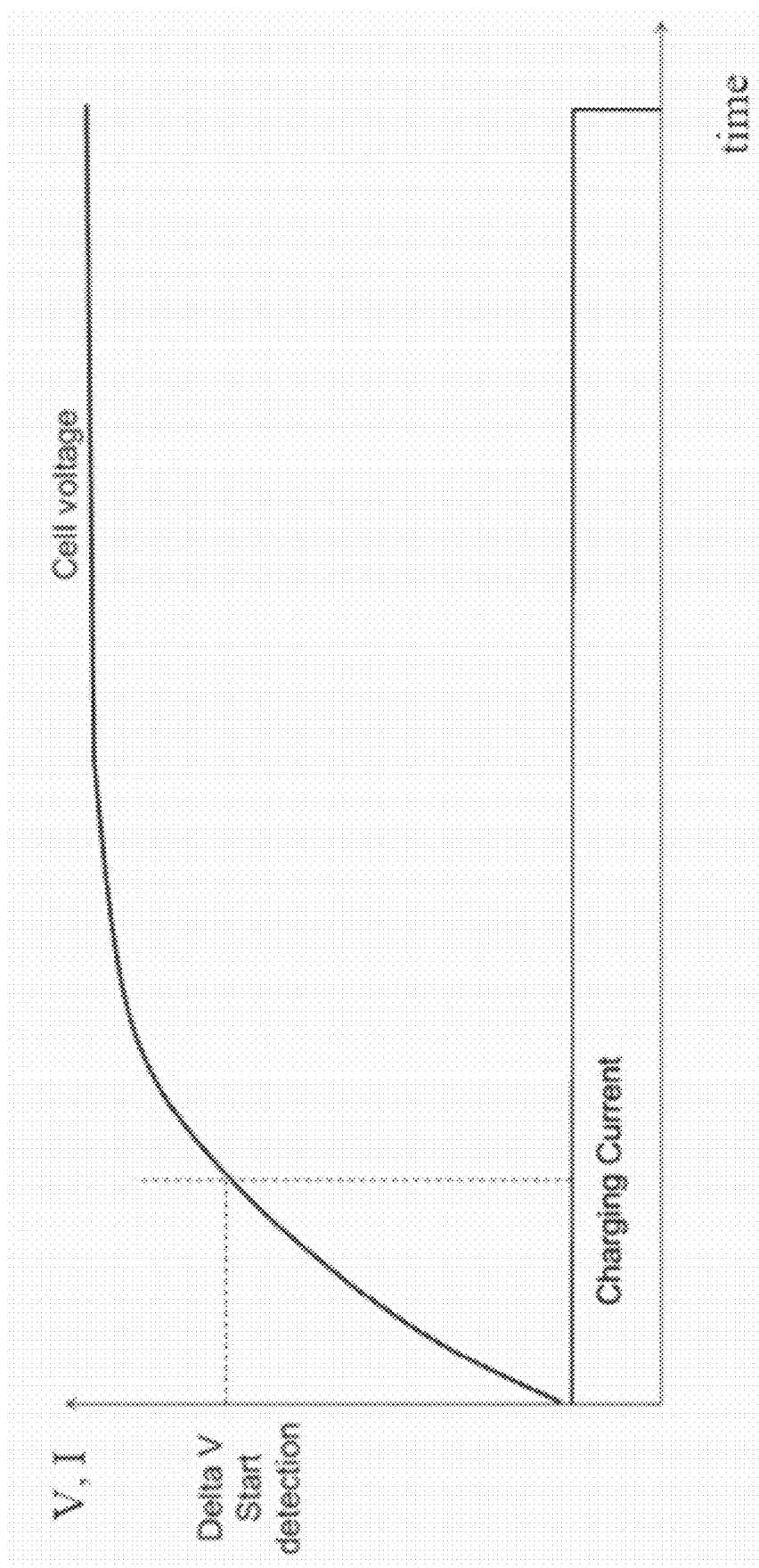
FIG. 7 shows a relation chart of a charge current versus a voltage of the cell.

According to this disclosure, the measurement of the voltage difference $\Delta V_{TDV}$ between the cells 221 to 224 is not restricted to the detection upon charging or in a static state. In order to ensure the stability and effectiveness of the voltage difference, in one embodiment, the measurement of the voltage difference $\Delta V_{TDV}$ between the cells 221 to 224 starts when the voltage of any of the cells 221 to 224 is higher than a voltage-difference-start-detecting value in a charging loop. FIG. 7 shows a relation chart of a charge current versus a voltage of the cell. With regard to the curve of the cell voltage, the vertical axis of FIG. 7 denotes the voltage, while the horizontal axis of FIG. 7 denotes the time. With regard to the curve of the charge current, the vertical axis of FIG. 7 denotes the current, while the horizontal axis of FIG. 7 denotes the time. Referring to FIG. 7, when the cell voltage is higher than the voltage-difference-start-detecting value in one charging loop, the cell voltage starts to become stable. At this time, detecting the voltages of the cells 221 to 224 can ensure the stability and effectiveness of the voltage difference.

For example, when the charging voltage of the cell is 4450 mV and the cell is at the low voltage, the voltages between the cells in each series have the poor consistency. When the cells are charged to more than 3700 mV, the consistency becomes stabler. Thus, the detection may be made at the stabler point of more than 3900 mV. As a result, when the voltages of the cells 221 to 224 in any series are higher than the voltage-difference-start-detecting value (i.e., higher than 3900 mV) upon charging, the BMU 211 starts to measure the voltage difference $\Delta V_{TDV}$ between the cells 221 to 224. If the voltage difference $\Delta V_{TDV}$ is higher than the updated condition of the charging voltage, the charging voltage is updated.

Figure 8:
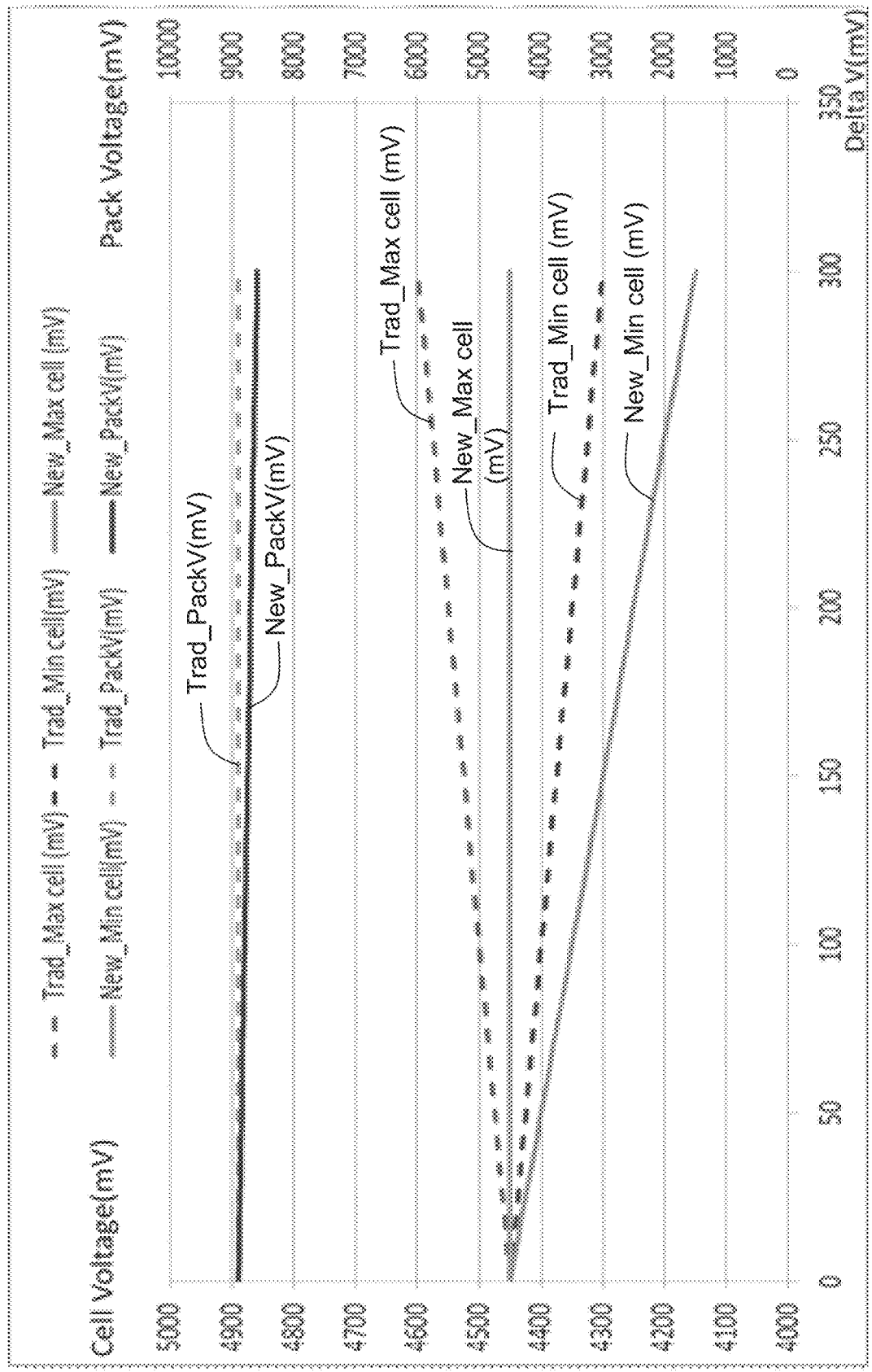
FIG. 8 is an experimental comparison chart of the prior art versus the second implementation aspect according to this disclosure.

According to the embodiments of this disclosure, timely or immediately adjusting or decreasing the charging voltage can still effectively control the voltages of the cells 221 to 224 not to continuously increase even if no balancing circuit is configured and no balancing mechanism is adopted in the battery pack 200. FIG. 8 is an experimental comparison chart of the prior art versus the second implementation aspect according to this disclosure. In FIG. 8, the vertical axis on the left side denotes the voltages of the cells 221 to 224 (cell voltages (mV)), and the vertical axis on the right side denotes the voltage of the battery pack (pack voltage (mV)). The horizontal axis denotes the voltage difference (Delta V (mV)), more specifically denotes the voltage difference between the lines or curves Trad_Max_cell (mV) and Trad_Min cell (mV), the voltage difference between the lines or curves New_Max cell (mV) and New_Min cell (mV), and the voltage difference between the lines or curves Trad_PackV (mV) and New_PackV (mV). The line or curve Trad_Max cell (mV) denotes the relationship between the maximum voltage of the cells and time when the conventional charging method is adopted. The line or curve Trad_Min cell (mV) denotes the relationship between the minimum voltage of the cells and time when the conventional charging method is adopted. The line or curve Trad_PackV (mV) denotes the relationship between the voltage of the battery pack and time when the conventional charging method is adopted. The line or curve New_Max cell (mV) denotes the relationship between the maximum voltage of the cells 221 to 224 and time when the charging method according to the second implementation aspect of this disclosure is adopted. The line or curve New_Min cell (mV) denotes the relationship between the minimum voltage of the cells 221 to 224 and time when the charging method according to the second implementation aspect of this disclosure is adopted. The line or curve New_PackV (mV) denotes the relationship between the voltage of the battery pack and time when the charging method according to the second implementation aspect of this disclosure is adopted.

Referring to FIG. 8, the dashed lines or curves denote the conditions in which the voltage differences between the cells 221 to 224 is obtained by using the conventional constant charging method to charge the unhealthy cells 221 to 224 with the constant charging voltage. According to the conventional constant charging method, the highest voltage of the cells 221 to 224 continuously increases to exceed the rated charging voltage values, which cause the safety doubt. The solid lines denote the conditions using the charging method according to the second implementation aspect of this disclosure, wherein the charging voltage is dynamically adjusted according to the voltage difference $\Delta V_{TDV}$ between the cells 221 to 224, so that the cells 221 to 224 can be charged in the state where the voltage difference $\Delta V_{TDV}$ is present. Accordingly, the over-voltage possibility of the cells 221 to 224 is thereby lessened. Referring to FIG. 8, when the voltage difference between the cells 221 to 224 occurs, the highest voltage of the cells 221 to 224 can be controlled not to exceed the rated charging voltage value (e.g., 4450 mV) due to the decrease of the charging voltage, so that the safety doubt can be eased.

In summary, according to an embodiment of this disclosure, no balancing circuit is configured and no balancing mechanism is adopted in the battery pack 200. Instead, the charging voltage is dynamically adjusted according to the voltage difference $\Delta V_{TDV}$ between the cells 221 to 224. Thus, even if the cells 221 to 224 are charged in the state with the voltage difference $\Delta V_{TDV}$, the highest voltage of the cells 221 to 224 can still be controlled not to exceed the rated charging voltage value of each cell due to the decrease of the charging voltage, so that the safety doubt can be lessened. Therefore, the problem can be avoided that the highest voltage of the cells 221 to 224 continuously increases and exceeds the rated charging voltage value when the constant charging voltage is used to charge the cells.

What is claimed is:

1. A charging method for charging multiple cells of a battery pack using a charging voltage, the method comprising steps of:
    setting a value of the charging voltage to a rated charging voltage value, and setting a potential failure voltage difference $\Delta V_{PF}$;
    using the rated charging voltage value to charge the cells of the battery pack, and detecting a voltage difference $\Delta V_{TDV}$ between the cells;
    obtaining a first charging voltage value smaller than the rated charging voltage value according to the voltage difference $\Delta V_{TDV}$ between the cells, and decreasing the value of the charging voltage from the rated charging voltage value to the first charging voltage value for charging the cells;
    obtaining a second charging voltage value smaller than the first charging voltage value according to the voltage difference $\Delta V_{TDV}$ between the cells, and decreasing the value of the charging voltage from the first charging voltage value to the second charging voltage value for charging the cells; and
    decreasing the charging voltage to a protection charging voltage value for the potential failure voltage difference $\Delta V_{PF}$ when the voltage difference $\Delta V_{TDV}$ between the cells satisfies the potential failure voltage difference $\Delta V_{PF}$,
    wherein the voltage difference $\Delta V_{TDV}$ between the cells is one of the voltage differences between arbitrary two of the cells.

2. The charging method according to claim 1, wherein in a charging process, the value of the charging voltage is not increased.

3. The charging method according to claim 2, wherein the step of obtaining the first charging voltage value smaller than the rated charging voltage value according to the voltage difference $\Delta V_{TDV}$ between the cells comprises:
    obtaining, from a memory of a battery management unit of the battery pack, a first threshold voltage and the first charging voltage value corresponding to the first threshold voltage, wherein the first charging voltage value is smaller than the rated charging voltage value and greater than the protection charging voltage value for the potential failure voltage difference $\Delta V_{PF}$;
    determining whether the voltage difference $\Delta V_{TDV}$ between the cells satisfies the first threshold voltage; and
    decreasing the value of the charging voltage from the rated charging voltage value to the first charging voltage value when the voltage difference $\Delta V_{TDV}$ between the cells satisfies the first threshold voltage.

4. The charging method according to claim 3, wherein the step of obtaining the second charging voltage value smaller than the first charging voltage value according to the voltage difference $\Delta V_{TDV}$ between the cells comprises:
    obtaining, from the memory of the battery management unit of the battery pack, a second threshold voltage and the second charging voltage value corresponding to the second threshold voltage, wherein the second charging voltage value is smaller than the first charging voltage value and greater than the protection charging voltage value for the potential failure voltage difference $\Delta V_{PF}$;
    determining whether the voltage difference $\Delta V_{TDV}$ between the cells satisfies the second threshold voltage; and
    decreasing the value of the charging voltage from the first charging voltage value to the second charging voltage value when the voltage difference $\Delta V_{TDV}$ between the cells satisfies the second threshold voltage.

5. The charging method according to claim 1, wherein the step of obtaining the first charging voltage value smaller than the rated charging voltage value according to the voltage difference $\Delta V_{TDV}$ between the cells comprises:
    calculating the first charging voltage value by using a charge function Fcv and the voltage difference $\Delta V_{TDV}$ between the cells.

6. The charging method according to claim 5, wherein the charge function Fcv is a function whose value does not rise with time.

7. The charging method according to claim 5, wherein the charge function Fcv is a function of the voltage difference $\Delta V_{TDV}$ between the cells.

8. The charging method according to claim 5, wherein:
    the charge function Fcv is a function of the voltage difference $\Delta V_{TDV}$ between the cells, a number of cells in series of the cells and the rated charging voltage value of the cells, and
    values determined by the charge function Fcv are smaller than the rated charging voltage value.

9. The charging method according to claim 8, wherein:
    the charge function Fcv is equal to (the rated charging voltage value xthe number of cells in series)–the voltage difference $\Delta V_{TDV}$×(the number of cells in series–N), where N is a natural number greater than or equal to 1 and smaller than the number of cells in series.

10. The charging method according to claim 1, wherein:
    the battery pack does not contain multiple balancing circuits respectively connected to the cells, and
    the charging method does not comprise a step of balancing the cells using the balancing circuits.

11. The charging method according to claim 1, wherein:
    detecting of the voltage difference $\Delta V_{TDV}$ between the cells starts when any voltage of the cells is greater than a voltage-difference-start-detecting value.

12. The charging method according to claim 1, wherein:
    the voltage difference $\Delta V_{TDV}$ between the cells is a voltage difference between a maximum voltage and a minimum voltage of the cells.

13. A battery pack, comprising multiple cells, wherein the cells are charged using the charging method according to claim 1.

* * * * *